United States Patent [19]
Yamazaki

[11] Patent Number: 5,738,337
[45] Date of Patent: Apr. 14, 1998

[54] POPPET DAMPER IN EXHAUST GAS DUCT

[75] Inventor: Satoshi Yamazaki, Akashi, Japan

[73] Assignee: ABB Fläkt AB, Stockholm, Sweden

[21] Appl. No.: 809,780

[22] PCT Filed: Sep. 25, 1995

[86] PCT No.: PCT/SE95/01086

§ 371 Date: Apr. 15, 1997

§ 102(e) Date: Apr. 15, 1997

[87] PCT Pub. No.: WO96/10144

PCT Pub. Date: Apr. 4, 1996

[30] Foreign Application Priority Data

Sep. 28, 1994 [JP] Japan .................. 6-257295

[51] Int. Cl.$^6$ .................................................. F16K 1/32
[52] U.S. Cl. .................................. 251/333; 251/318
[58] Field of Search ........................... 251/333, 324, 251/319, 318; 55/344, 341.1, 341.6

[56] References Cited

U.S. PATENT DOCUMENTS

| | | |
|---|---|---|
| 3,951,130 | 4/1976 | Lowe ........................... 251/333 X |
| 4,103,708 | 8/1978 | Huntington . |
| 4,274,516 | 6/1981 | Barley ........................... 251/318 X |
| 4,345,623 | 8/1982 | Krull et al. ...................... 251/318 X |
| 4,354,528 | 10/1982 | McAndrew . |
| 4,360,370 | 11/1982 | McAndrew . |
| 4,523,931 | 6/1985 | Miller et al. . |

*Primary Examiner*—Kevin Lee
*Attorney, Agent, or Firm*—Burns, Doane, Swecker & Mathis, L.L.P.

[57] ABSTRACT

The present invention provides a poppet damper, disposed in an exhaust gas duct, which makes it possible to perform an easy machining for providing a sealing surface and which provides excellent sealing following deformation caused by heat. The poppet damper includes a damper seat, disposed in a duct casing; a poppet plate for controlling exhaust gas flow by adjustment of a gap between the poppet plate and the damper seat; and an air cylinder and a damper shaft for allowing driving of the aforementioned poppet plate in a reciprocating manner. A seal plate is mounted to the poppet plate (3), which seal plate is separated by a gap of predetermined size from the poppet plate, with the seal plate placed in contact with the damper seat when the damper is closed.

9 Claims, 3 Drawing Sheets

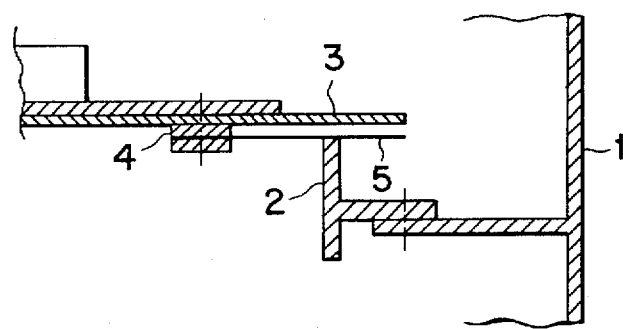
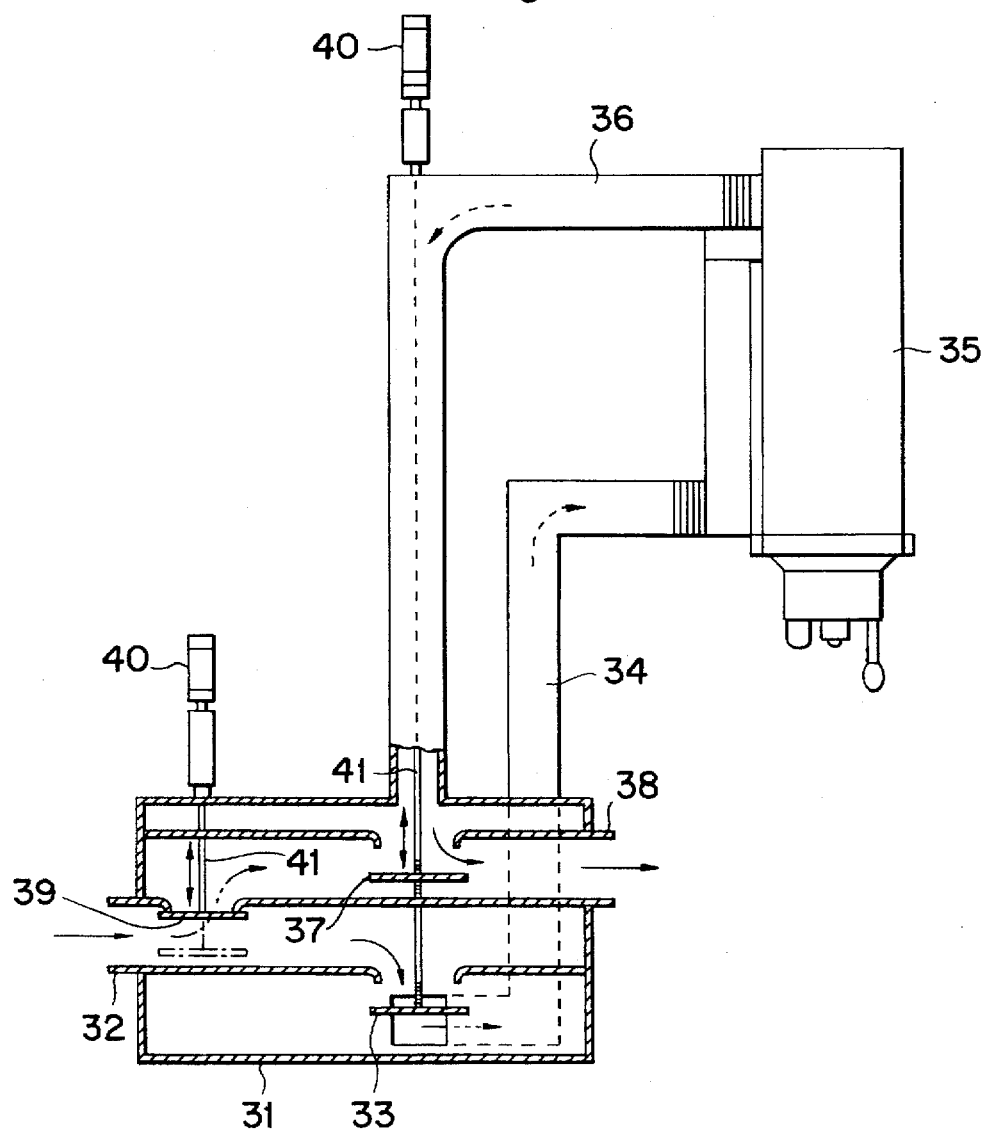

POPPET DAMPER IN EXHAUST GAS DUCT

TECHNICAL FIELD

The present invention relates to a poppet damper for controlling gas flow, the poppet damper being disposed in a duct for conveying exhaust gas such as hot exhaust gas discharged from, for example, a general boiler or incinerator, and, more paticularly, to such a poppet damper with improved sealing.

BACKGROUND ART

A conventional poppet damper in an exhaust gas duct is illustrated in FIG. 4. In this poppet damper, an openable and closable poppet plate p of a poppet damper P is placed on a damper seat d disposed at a gas flow control portion in an exhaust gas duct D. It controls gas flow by an opening-and-closing operation of the poppet plate p by a driving device M via a damper shaft S.

In the aforementioned conventional poppet damper P, however, only one plate is used for the poppet plate p, which results in the necessity of using highly-sophisticated manufacturing and mounting adjustment techniques to improve sealing, in higher machining costs, etc.

In particular, when hot exhaust gas flows, the heat of the hot exhaust gas deforms the poppet plate p, the damper shaft S, the damper seat d, the duct casing D, etc., which results in inadequate sealing.

Accordingly, an object of the present invention is to overcome the aforementioned conventional problems by providing a poppet damper in an exhaust gas duct allowing easy sealing surface machining for providing a sealing surface and providing excellent sealing despite deformation caused by heat.

DISCLOSURE OF THE INVENTION

To this end, according to the present invention, there is provided a poppet damper including a damper seat, disposed in a duct casing; a poppet plate for controlling exhaust gas flow by adjustment of the gap between the poppet plate and the damper seat; and driving means for reciprocatingly driving the poppet plate, wherein a seal plate is mounted on the poppet plate, which seal plate is separated by a gap of predetermined size from the poppet plate, with the seal plate placed in contact with the damper seat, when the damper is closed. The aforementioned seal plate is preferably 0.3 to 1.0 mm thick. The gap of predetermined size between the aforementioned poppet plate and the aforementioned seal plate is preferably formed by interposing a spacer 0.5 to 2.0 mm thick therebetween.

BRIEF DESCRIPTION OF THE DRAWINGS

FIG. 2 is an enlarged view of a critical portion of a poppet damper of an embodiment of the present invention;

FIG. 3 is a schematic view of a construction of an incineration facility exhaust gas treatment system with a poppet damper of the present invention installed therein.

BEST MODE FOR CARRYING OUT THE INVENTION

Figure 1:
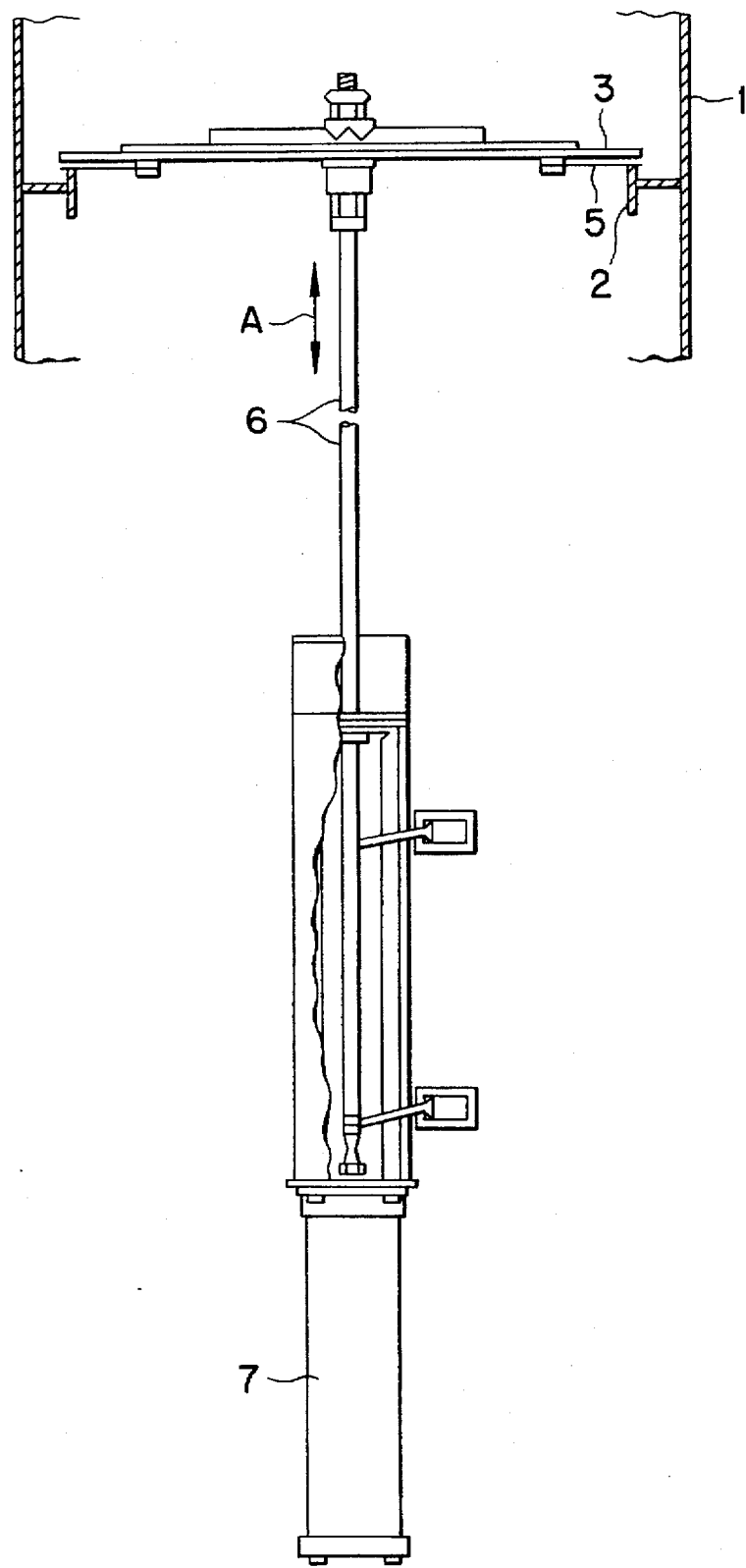
FIG. 1 illustrates a poppet damper of an embodiment of the present invention.
Figure 4:
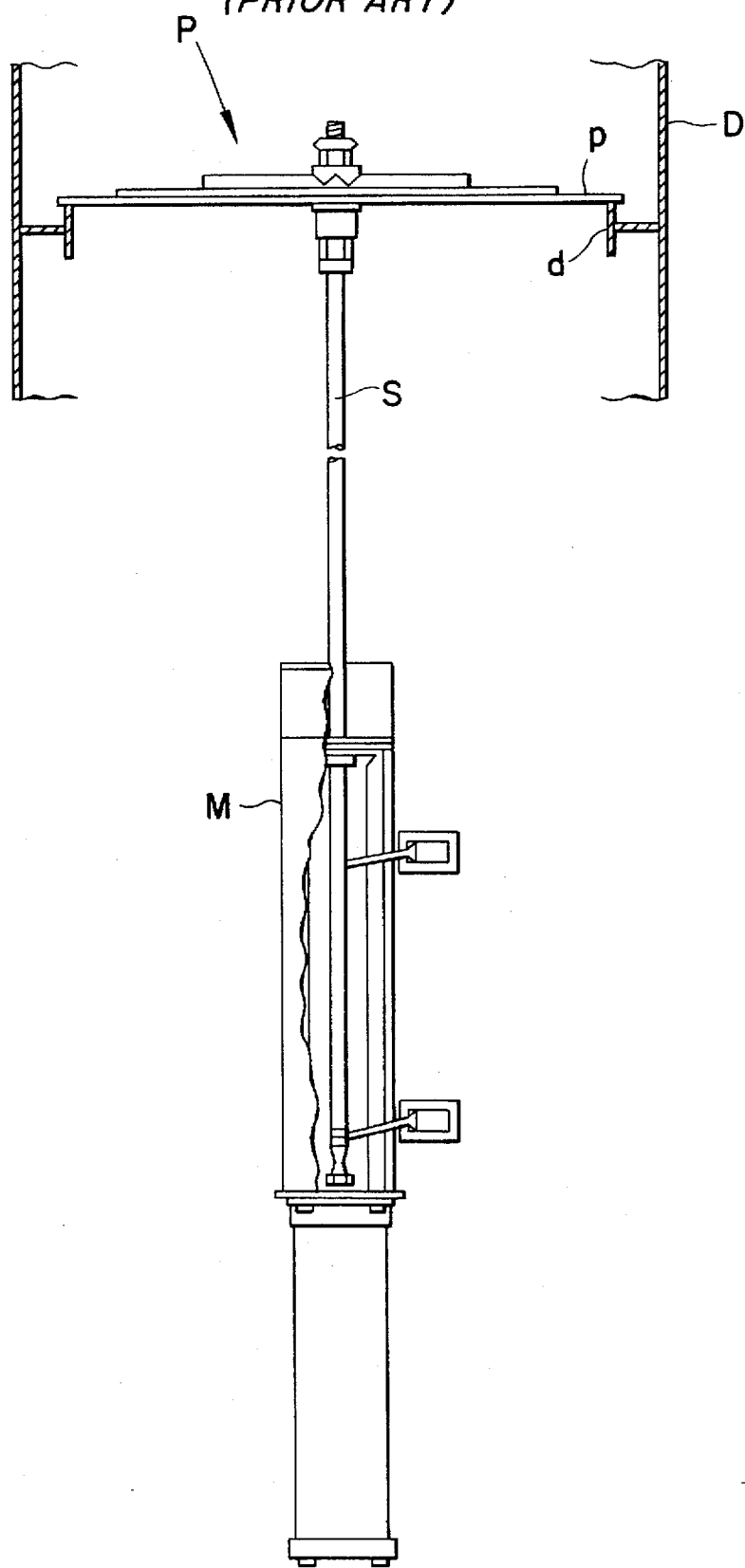
FIG. 4 is a schematic view of a construction of a conventional poppet damper.

FIGS. 1 and 2 each illustrate an embodiment of the present invention. A cylindrical damper seat 2, which forms an opening 1.2 meters in diameter, is provided in a steel-plate duct casing 1.

Reference numeral 3 denotes a poppet plate of a mild steel which is 1.3 meters in diameter and 4.5 mm thick. The poppet plate has attached thereto a 0.5 mm thick seal plate 5 of a stainless steel by a 1 mm thick spacer 4.

The aforementioned poppet plate 3 is driven in the directions indicated by arrow A by an air cylinder 7 via a damper shaft 6 to adjust the size of the gap between the aforementioned seal plate 5 and the aforementioned damper seat 2, whereby exhaust gas flow is controlled.

Although when the damper is closed, the aforementioned seal plate 5 is in contact with the aforementioned damper seat 2, it is necessary to take into account deformation of the poppet plate 3, the seal plate 5, etc., when hot exhaust gas flows. In this embodiment, the pressure difference between the upper and the lower flow at the poppet plate 3 and the seal plate 5 is 1.47 kPa (at a maximum temperatuxe of 190° C.). Accordingly, at initial setting, the position of the poppet plate 3 is adjusted so that the damper seat 2 and the seal plate 5 are separated by a gap of 0.5 mm, which results in almost no leakage after temperature rise.

FIG. 3 is a schematic view of a construction of an exhaust gas treating system in a waste incineration facility, which has installed therein three poppet dampers according to the present invention. In this embodiment, the exhaust gas, discharged from the incineration facility at a capacity of 260 $m^3$/min, enters from an exhaust gas inlet duct 32 of a damper box 31, and then, generally, passes through a bag filter inlet damper 33 (1.3 meters in diameter), a bag filter inlet duct 34, and then through a bag filter 35 which removes the dust in the exhaust gas. When exhaust gas flows through, the temperature in the damper box 31 is 190° C.

The exhaust gas, purified by the bag filter 35, passes from a bag filter outlet duct 36 through a bag filter outlet damper 37 (1.3 meters in diameter) and is then discharged from an exhaust gas outlet duct 38. The bag filter inlet damper 33 and the bag filter outlet damper 37 are mounted to the same damper shaft 41.

When the bag filter 35 is not being used or during an emergency, with the bag filter inlet damper 33 and the bag filter outlet damper 37 closed, the exhaust gas is discharged from a bypass damper 39 (1.3 meters in diameter), being opened to the dotted line in the figure, directly to the exhaust gas outlet duct 38. Although an air cylinder 40 is used for driving the poppet damper of the present invention, other devices such as a motor-type driving device may also be used for the same purpose.

As the bag filter inlet damper 33 and the bag filter outlet damper 37 of the embodiment, it is possible to simultaneously move a plurality of dampers in a reciprocating manner by an ascending-and-descending type driving device. It is to be noted that interlocking of a plurality of ascending-and-descending type driving devices are controlled by a program control device (not shown).

In addition to a poppet plate, a seal plate is provided at a fixed distance therefrom, which not only allows sealing to be improved, but also prevents pressure difference in the damper from affecting seal plate sealing, even when deformation of the damper seat, etc., occurs due to hot exhaust gas.

What is claimed is:

1. A poppet damper comprising:
    a damper seat;
    a poppet plate for controlling exhaust gas flow by adjustment of a gap between said poppet plate and said damper seat;

driving means for reciprocatingly driving said poppet plate;

a seal plate mounted to said poppet plate, said seal plate being separated by a gap of predetermined size from said poppet plate, said seal plate being in contact with said damper seat when said poppet damper is closed; and a spacer interposed between said poppet plate and said seal plate to separate said seal plate from said poppet plate by said gap of predetermined size, said seal plate and said poppet plate both having larger outside diameters than said spacer.

2. A poppet damper according to claim 1, wherein said seal plate is 0.3 to 1.0 mm thick.

3. A poppet damper gas according to claim 1, wherein said spacer is between 0.56 to 2.0 mm thick.

4. A poppet damper according to claim 1, wherein said seal plate is ring-shaped.

5. A poppet damper according to claim 2, wherein said spacer is between 0.5 to 2.0 mm thick.

6. A poppet damper according to claim 4, wherein said spacer is between 0.5 to 2.0 mm thick.

7. A poppet damper according to claim 2, wherein said seal plate is ring-shaped.

8. A poppet damper according to claim 3, wherein said seal plate is ring-shaped.

9. A poppet damper according to claim 5, wherein said seal plate is ring-shaped.

* * * * *